(12) United States Patent
Nishiuchi

(10) Patent No.: US 7,777,807 B2
(45) Date of Patent: Aug. 17, 2010

(54) ON-BOARD OBJECT DETECTOR AND ON-BOARD OBJECT DETECTION METHOD

(75) Inventor: Hidekazu Nishiuchi, Chiba (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1139 days.

(21) Appl. No.: 11/429,046

(22) Filed: May 5, 2006

(65) Prior Publication Data

US 2006/0250516 A1    Nov. 9, 2006

(30) Foreign Application Priority Data

May 6, 2005    (JP)    ............... 2005-135074

(51) Int. Cl.
    *H04N 5/225*    (2006.01)
(52) U.S. Cl. ............... 348/370; 348/92; 348/94; 356/606
(58) Field of Classification Search ........... 348/370, 348/371, 92–94; 356/601, 606; 382/154
    See application file for complete search history.

(56) References Cited

U.S. PATENT DOCUMENTS

| 5,495,337 A * | 2/1996 | Goshorn et al. ............ 356/601 |
| 6,205,243 B1 * | 3/2001 | Migdal et al. ............... 382/154 |
| 6,477,260 B1 | 11/2002 | Shimomura |
| 6,535,114 B1 | 3/2003 | Suzuki et al. |
| 2001/0019356 A1 | 9/2001 | Takeda et al. |
| 2005/0013477 A1 * | 1/2005 | Ratti et al. .................. 382/154 |

FOREIGN PATENT DOCUMENTS

JP    2003-240525    8/2003

* cited by examiner

*Primary Examiner*—Tuan Ho
(74) *Attorney, Agent, or Firm*—Young Basile

(57) ABSTRACT

An on-board object detector and on-board object detection method for detecting an object present in a pickup image at a high level of precision. A controller controls a projector to irradiate a line of light while shifting the irradiation angle, and images in the coverage area of the line of light are captured for multiple frames using a camera. Then, shifts in the moving speed of the line of light in the images across the frames are computed based on the images captured, and shifting points in the moving speed of the line of light are detected based on the computed shifts in the moving speed of the line of light in the images across the frames. The position and size of an object that is present in the images are specified based on said detected shifting points in the moving speed of the line of light.

20 Claims, 6 Drawing Sheets

ON-BOARD OBJECT DETECTOR AND ON-BOARD OBJECT DETECTION METHOD

TECHNICAL FIELD

The present invention pertains to an on-board object detector that is installed on a vehicle and is used to apply image processing to images captured using a camera to detect an object that is present within the images and pertains to an on-board object detection method.

BACKGROUND

A foreign object detector is known through Japanese Kokai Patent Application No. 2003-240525, by example. In the case of this foreign object detector, light is irradiated onto a road surface, catoptric light is received, and image processing is applied to the catoptric result to obtain a moiré image. Then, points on moiré fringes in the moiré image are triangulated to obtain their distances to separate the coverage area where the object is present from the coverage area and where the background is present within the image in order to detect a concave or convex object.

BRIEF SUMMARY OF THE INVENTION

Embodiments of the invention provide an on-board object detector and an on-board object detection method. The on-board object detector can include, for example, a projector operable to irradiate a horizontally-extending line of light in a direction of an object to be detected while shifting an irradiation angle of the line of light in a vertical direction, a pickup device operable to capture images within a coverage area where the line of light is irradiated, and a controller operable to compute shifts in a moving speed of the line of light within the images and to detect the object based on the shifts in the moving speed of the line of light.

As another example, the on-board object detector can include projection means for irradiating a horizontally-extending line of light in a direction of an object to be detected while shifting an irradiation angle in the vertical direction, pickup means for capturing images within a coverage area where the line of light is irradiated by the projection means, velocity computation means for computing shifts in a moving speed of the line of light within the images based on the images captured by the pickup means, and object detection means for detecting the object based on the shifts in the moving speed of the line of light within the images as computed by the velocity computation means.

An on-board object detection method as taught herein can include, by example, irradiating a horizontally-extending line of light in a direction of an object to be detected while shifting an irradiation angle in a vertical direction, capturing images within a coverage area where the line of light is irradiated, computing shifts in a moving speed of the line of light within the images, and detecting the object based on the shifts in the moving speed of the line of light.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In the foreign object detector previously described, because the coverage area where the object is present and the coverage area where the background is present are separated from each other based on the moiré fringes, the coverage areas are subject to low resolution, resulting in the problem of low object detection precision.

According to teachings of the present invention, a horizontally-extending line of light is irradiated in the direction of an object to be detected while shifting the irradiation angle in the vertical direction. Multiple frames of images are captured within the coverage area where the line of light is irradiated. Shifts in the moving speed of the line of light within the images across the frames are computed based on the images captured. Shifting points in the moving speed of the line of light are detected based on the computed shifts in the moving speed of the line of light within the images across the frames. The object is detected by specifying the position and the size of the object that is present within the images based on the detected shifting points in the moving speed of the line of light.

As a result, the position and the size of the object can be specified highly precisely during the detection of the object by recognizing that the moving speed of the line of light irradiated to an object with a height is different from the moving speed of the line of light irradiated to a flat surface.

Figure 1:
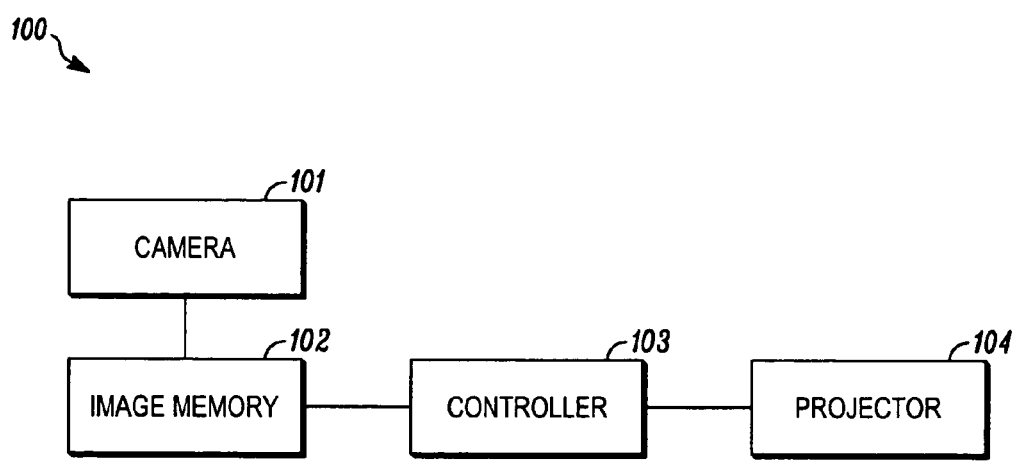
FIG. 1 is a block diagram showing an example configuration of an on-board object detector according to an embodiment.

Details of the inventive features are best described with reference to the drawing figures. FIG. 1 is a block diagram showing an example configuration of an on-board object detector. On-board object detector 100 is to be installed in a vehicle, and it is equipped with pickup means such as camera 101 for capturing images in front of the vehicle. On-board detector 100 also includes image memory 102 for storing the images captured by camera 101 and controller 103 that contains a central processing unit (CPU) and peripheral circuits for executing various processes to be described later, including velocity computation, shift point detection and object detection. The image memory 102 could, of course, be integral with the camera 101 or could be omitted in the event on-board memory of controller 103 is used for storing images. Finally, on-board detector 100 includes projector 104 for irradiating a light to the front of the vehicle.

Projector 104 irradiates a single narrow straight line of light (hereinafter, the line of light) to the front of the vehicle parallel to the road surface, and its irradiation angle can be shifted in the vertical direction. Camera 101 is a high-speed camera equipped with a pickup device such as a CCD or a CMOS, and it captures images continuously within the coverage area of the line of light irradiated by projector 104 at extremely small prescribed time Δt intervals, for example at 1 ms intervals, while the vehicle is traveling and outputs the images frame by frame to image memory 102.

Controller 103 controls projector 104 such that it irradiates the line of light to a target detecting object present in front of the vehicle while shifting the irradiation angle at a fixed rate from the bottom up. At this time, camera 101 is controlled to capture images in front of the vehicle, that is, in the coverage area of the line of light irradiated by projector 104, continuously. As a result, continuous images in front of the vehicle captured by scanning the line of light from the bottom up at the fixed rate, that is, multiple frames of images captured at minute time intervals, can be obtained.

Figure 2:
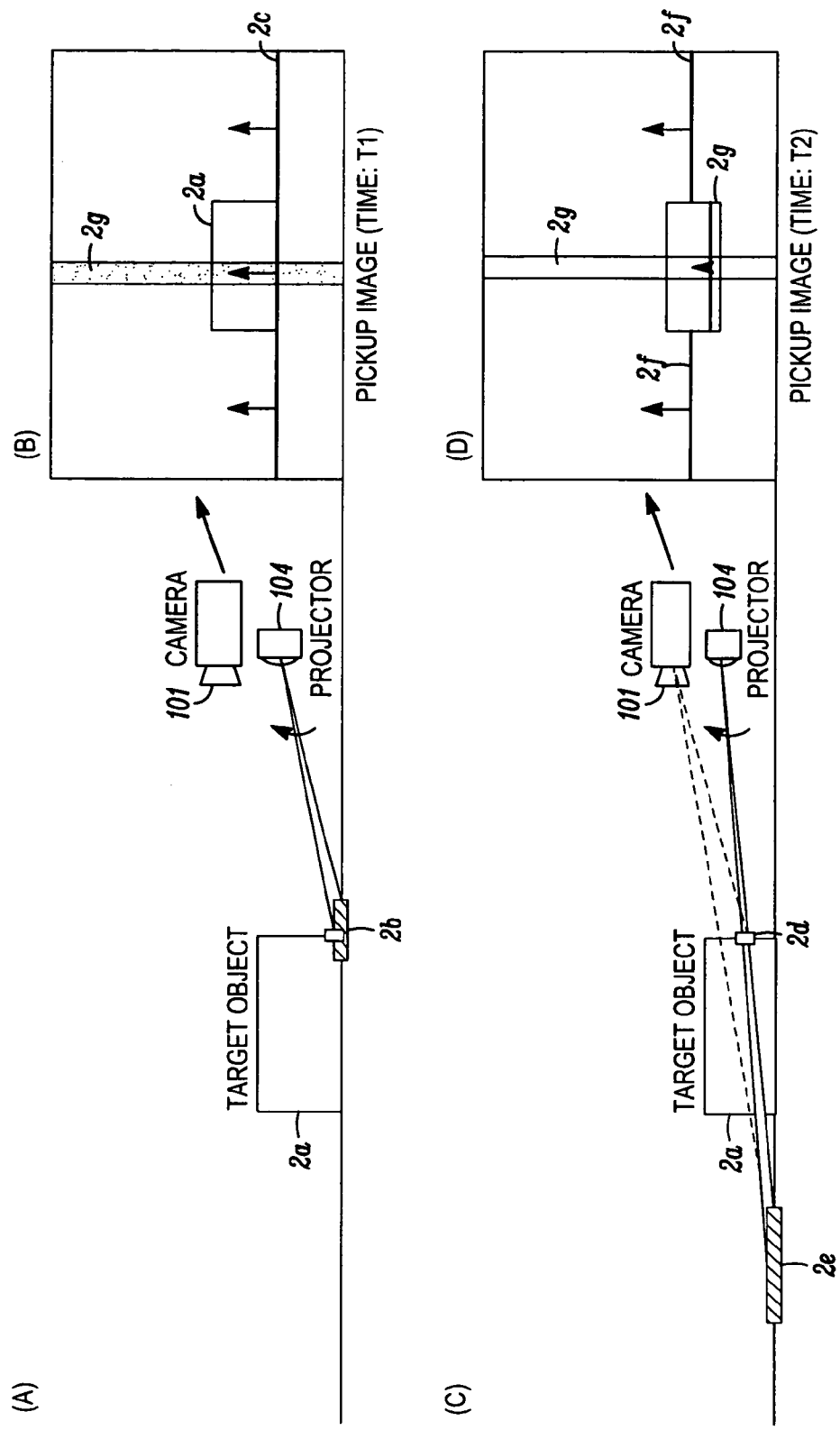
FIG. 2 is a schematic diagram showing movement of the line of light in the pickup image when an object is present.

As shown in FIG. 2, a case in which the relationships among the object and camera 101 and projector 104 are viewed in the horizontal direction, that is, from a side, will be examined. In this case, when the irradiation angle of projector 104 is shifted from the bottom up when a target object, for example, object 2a, is present in front of the vehicle, the line of light reaches bottom position 2b of object 2a at time T1 after it is irradiated to the road surface as shown in representation (A). The image (B) captured by camera 101 at this time, that is, the image captured at time T1, shows the conditions.

Because bottom position 2b of object 2a is in contact with the road surface in the image (B) captured at time T1, the distance from camera 101 to the position of line of light 2b irradiated within the coverage area to where bottom position 2b of the object is irradiated matches that within the coverage area where the road surface is irradiated at this point in time. Thus, as shown in the image (B), at the point when the line of light irradiated from projector 104 has reached bottom position 2b of object 2a, the line of light in the pickup image (B) is shown as a straight line that passes through bottom position 2b of object 2a as indicated by symbol 2c without deviating at the boundary between object 2a and the surrounding road surface.

In contrast, because the line of light from projector 104 has already moved upward at time T2 when a prescribed amount of time has passed since T1 as shown in representation (C), point 2d on object 2a is irradiated within the coverage area where object 2a is present. Road surface 2e is irradiated further away on either side of object 2a than at time T1. Therefore, the image (D) captured by camera 101 at this time, that is, the image (D) captured at time T2, shows these conditions.

In the image (D) captured at time T2, the distance from camera 101 to the bottom position 2b line of light is irradiated becomes different within the coverage area where object 2a is irradiated and within the coverage area where the road surface 2e is irradiated at this point in time in which the coverage area where object 2a is irradiated becomes closer than the coverage area where the road surface 2e is irradiated. Thus, as shown in the pickup image (D), the line of light is shown as the image indicated by symbol 2f within the coverage area where the line of light irradiates road surface 2e, and it is shown as indicated by symbol 2g within the coverage area where the line of light irradiates point 2d on object 2a.

Line of light 2g captured on object 2a is shown at a lower position than line of light 2f captured on the road surface 2e in the pickup image (D) at time T2 because the moving speed of line of light 2g captured on object 2a is slower than that of line of light 2f captured on the road surface 2e on the image (D) while the line of light 2g is irradiated within object 2a due to the difference in the distance from camera 101 to point 2d on object 2a and its distance to road surface 2e in real space.

In order to specify the boundaries of the object in the vertical direction within the pickup image while considering this point, observation lines 2g are placed inside the pickup image of each frame as shown in images (B) and (D). Observation lines 2g are placed over the entire pickup image, and they have a width of 1 pixel and a height extending from the bottom to the top of the pickup image in order to allow the pickup image to be monitored from the bottom to the top. That is, the entire pickup image is divided by multiple observation lines 2g with a prescribed width.

Then, movement of the line of light on the image inside observation lines 2g across the frames is monitored in order to compute the moving speed. Furthermore, the movement of the line of light within respective observation lines 2g can be observed by extracting only the parts that show shifts across the frames, that is, the positions where the line of light is irradiated, by computing differences across the frames of images. Then, the moving speed of the line of light on the image within observation lines 2g can be computed by dividing the positional shifts of the line of light across the frames, that is, shifts in the coordinate values in the vertical direction on the image, by the frame rate of camera 101.

In order to simplify the explanation given below, a case will be explained in which the time it takes for the line of light to move from the bottom to the top of observation line 2g is taken as 1 cycle, and in which movement of the line of light during 1 cycle on arbitrary observation line 2g is monitored in order to detect the object that is present in the observation line 2g. Therefore, the object can be detected from the entire pickup image by executing processing to be described next with respect to all observation lines 2g placed in the pickup image. Furthermore, a new status of the object can be detected constantly by repeating multiple cycles.

Figure 3:
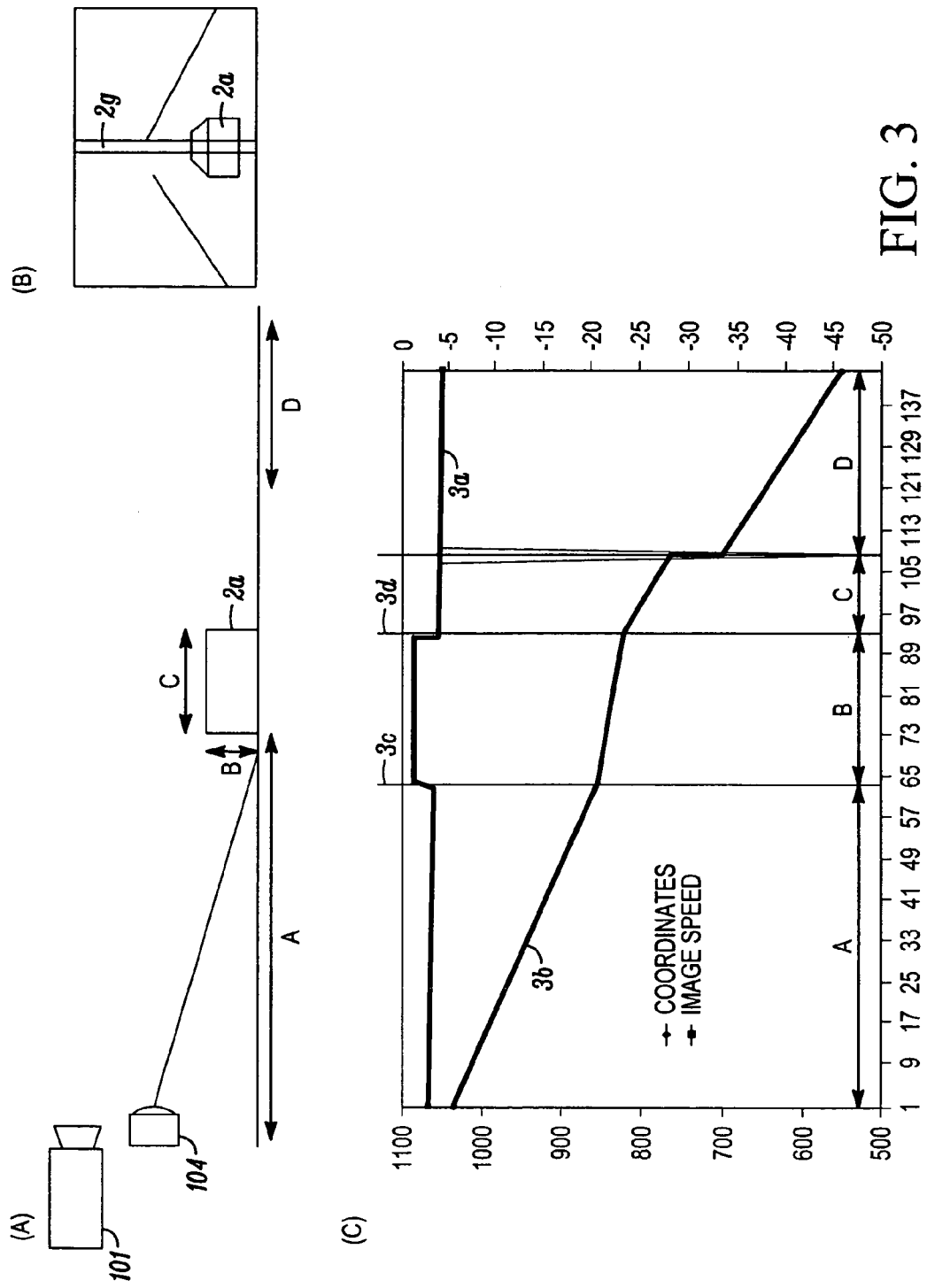
FIG. 3 is a diagram showing a specific example of shift in the moving speed of the line of light in the image when an object is present.

As shown in representation (A) of FIG. 3, a line of light is irradiated from the bottom up while shifting the angle of projector 104, and images are captured continuously using camera 101 in order to obtain the image (B). A case will be explained in which the object is present in observation line 2g that is placed near the center of the image in the horizontal direction out of observation lines 2g placed in the pickup image captured.

In this case, as shown in representation (A), the coverage area where the light is irradiated by projector 104 is divided into the four coverage areas indicated by symbols A-D. That is, the coverage area is divided into coverage area A where the light is irradiated to the road surface closer than object 2a, coverage area B where the light is irradiated to a side surface of object 2a, coverage area C where the light is irradiated to the upper surface of object 2a, and coverage area D where the light is irradiated to the road surface beyond object 2a.

Then, the moving speed (image speed) of the line of light on the image in observation lines 2g in each frame is computed. Referring now to graph (C), when this operation is repeated with respect to multiple frames within 1 cycle, moving speed 3a of the line of light on the image in observation lines 2g in respective coverage areas A-D results, for example, and shifts 3b in the y-coordinate value of the line of light in observation lines 2g can be computed. For the graph (C) of FIG. 3, the ordinate (1100 . . . 1000 . . . 900 . . . ) indicates pixels, and the abscissa (1 . . . 9 . . . 17 . . . ) indicates time. Since the ordinate on the right side (0 . . . 5 . . . 10 . . . ) merely indicates the velocity slope for descriptive purposes, it can be ignored without any problem.

In graph (C) of FIG. 3, it is clear from representation (A) that while the moving speed of the line of light is constant in the coverage areas where the line of light scans a part that appears as a flat surface when looked at from above, that is, in coverage areas A, C, and D, the moving speed of the line of light is slower than that in coverage areas A, C and D in a coverage area where a height from the road surface is present, that is, in coverage area B. In other words, the moving speed of the line of light discontinuously decreases at boundary point 3c between coverage area A and coverage area B, and the moving speed of the line of light discontinuously increases at boundary point 3d between coverage area B and coverage area C.

When this point is considered, a judgment can be made that an object with a height that falls in the coordinate range in which the line of light has moved in observation lines 2g is present between shifting point (decreasing point) 3c to the next shifting point (increasing point) 3d. Therefore, when observation lines 2g are placed over the entire pickup image, the shifts in the moving speed of the line of light in respective observation lines 2g are detected, and coordinate values at these shifting points are specified. From these points, the height of the object in the pickup image can be detected.

For the computation of the moving speed of the line of light, since line 3b in graph (C) indicates the shift in the y-coordinate value, the velocity of the line of light can be computed by obtaining the time required for 1 pixel by looking at the slope of the Y coordinate (in the vertical direction). Then, shifts in the computed moving speed of the line of light are indicated by line 3a.

Next, for object 2a detected in the pickup image in this manner, the height of the line of light irradiated onto object 2a from the road surface in real space and the distance from camera 101 to the irradiation point (observation point) of the beam of light irradiated on object 2a can be computed in the following manner.

Figures 4, 5:
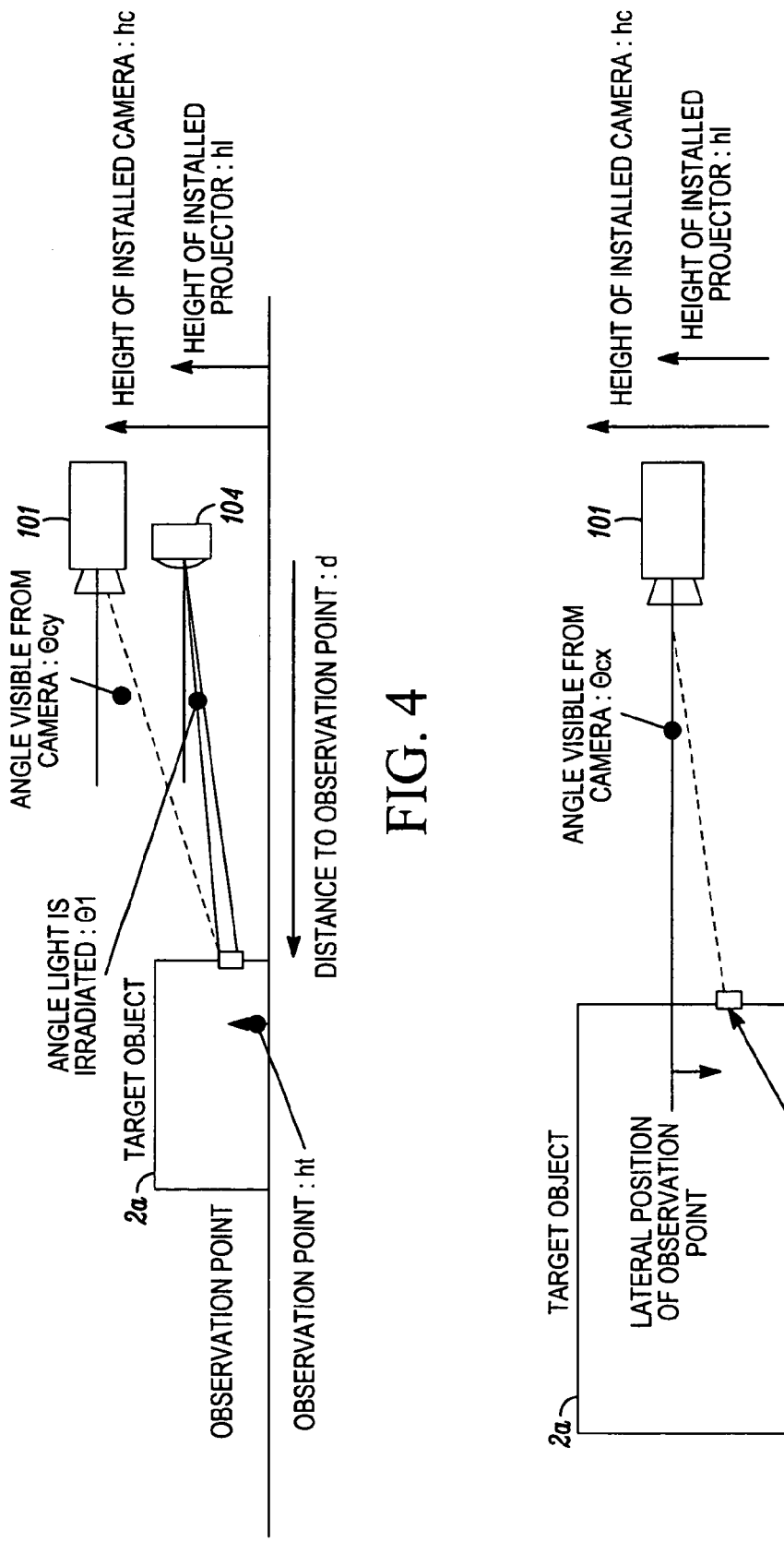
FIG. 4 is a diagram showing an example when computing the height of the observation point and the distance to the observation point on the object.
FIG. 5 is a diagram showing an example when computing the lateral position of the observation point on the object.

As shown in FIG. 4, the installation height of camera 101 from the road surface is denoted as hc. The installation height of projector 104 is denoted as hl. The distance from camera 101 to the observation point is denoted as d. The height from the road surface to the observation point is denoted as ht. The angle (irradiation angle) of the line of light irradiated by projector 104 in the vertical direction is denoted as θ1, and the angle in the vertical direction at which the observation point is visible from camera 101 is denoted as θcy. Given these variables, the relationship between the observation point as viewed from camera 101 and the observation point where the light is irradiated can be expressed using Formulas (1) and (2) given below.

$$\tan \theta cy = (hc-ht)/d \quad (1)$$

$$\tan \theta 1 = (hl-ht)/d \quad (2)$$

From Formulas (1) and (2), d and ht are computed using Formulas (3) and (4).

$$ht = (hc \cdot \tan \theta 1 - hl \cdot \tan \theta cy)/(\tan \theta cy - \tan \theta 1) \quad (3)$$

$$d = (hc - hl)/(\tan \theta cy - \tan \theta 1) \quad (4)$$

As such, distance d from camera 101 to the observation point and height ht from the road surface to the observation point can be computed based on known camera installation height hc and projector height hl, current irradiating direction θ1, and visible angle θcy from camera 101 in the vertical direction that can be computed from coordinate values in the image. Thus, the height of the object in real space can be computed by taking the position on the object as computed based on the coordinate values of the point where the moving speed of the line of light shifts as the observation point and computing height ht to the observation point.

As shown further in FIG. 5, the lateral position of the observation point on object 2a can also be computed. Unlike FIGS. 2-4, FIG. 5 is a schematic diagram illustrating the positional relationship between object 2a and camera 101 when looked at from above. In the example shown in FIG. 5, when the angle in the horizontal direction at which the observation point is visible from camera 101 is denoted as θcx, lateral position x of the observation point on object 2a is expressed by Formula (5) given below.

$$\tan \theta cx = x/d \quad (5)$$

Therefore, lateral position x of the observation point on object 2a can be computed based on distance d from camera 101 to the observation point as computed using Formula (4) and angle θcx in the horizontal direction at which the object is visible from camera 101.

When the processing explained above is executed with respect to all observation lines 2g placed in the pickup image in the manner described above to detect objects in the entire pickup image, heights of all objects that are present in the pickup image, distances d from camera 101 to observation points, heights ht from the road surface to the observation points, and lateral positions x of the observation points on the objects in real space can be computed.

As such, lateral boundaries of object 2a can be specified based on lateral positions x of observation points out of multiple observation lines 2g placed on the pickup image that are computed within observation lines 2g present at the boundaries where shifts in the moving speed of the line of light are detected, so that the width of the object in real space can be computed.

The size of the object in real space can be specified based on the height of the object and the width of the object in real space as computed through the aforementioned processing. Furthermore, because the positions of the objects in real space can be determined by computing distances d from camera 101 to the observation points and lateral positions x of the observation points, objects that are present in the pickup image can be detected.

Figure 6:
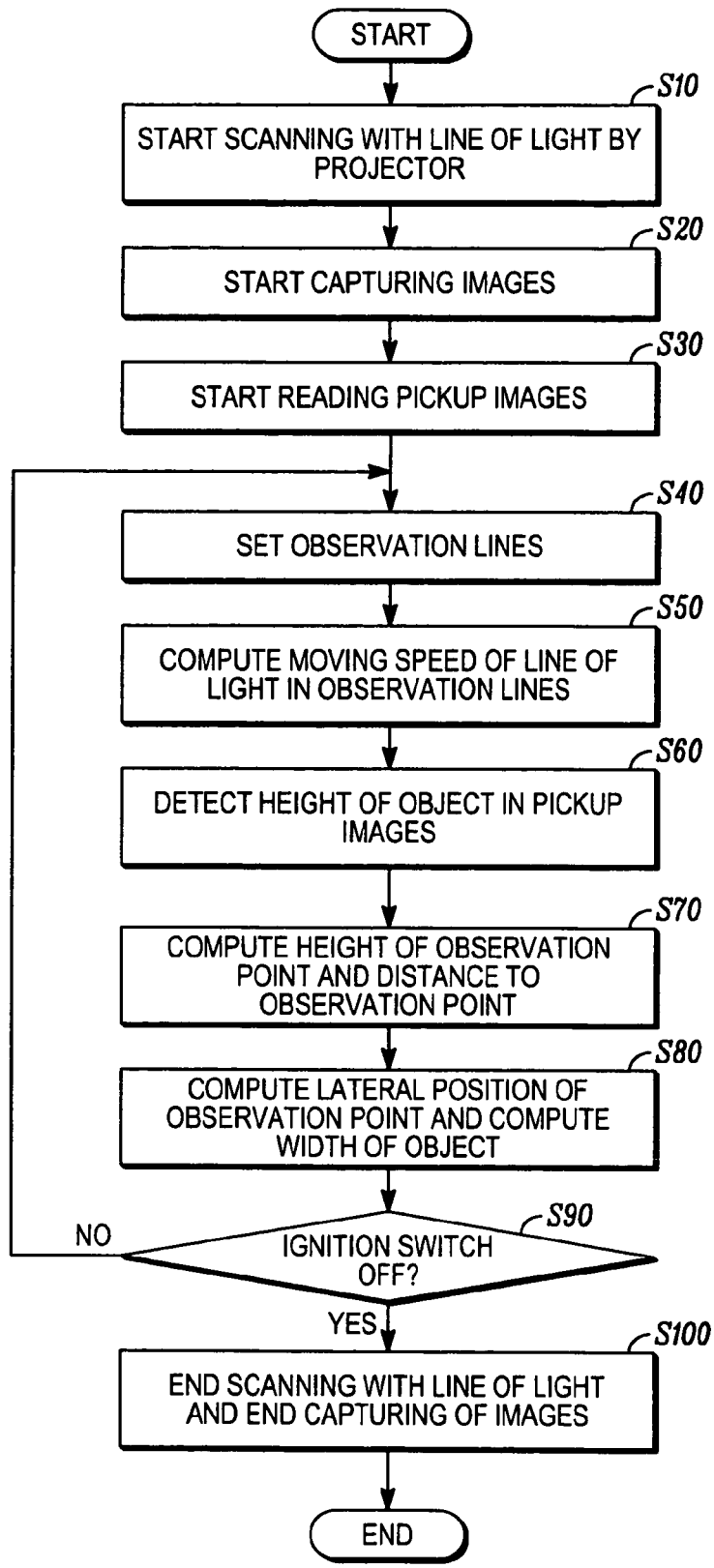
FIG. 6 is a flow chart showing processing to be carried out by the on-board object detector.

FIG. 6 is a flow chart showing processing to be carried out by on-board object detector 100 to obtain the desired results. The processing shown in FIG. 6 is executed by controller 103 as a program that is activated when power to on-board object detector 100 is turned on when the ignition key of the vehicle is turned on. In step S10, scanning using the line of light from projector 104 toward the front of the vehicle is initiated, and advancement is made to step S20. In step S20, capturing of images in front of the vehicle by camera 101 is initiated, and advancement is made to step S30.

In step S30, reading of a pickup image from image memory 102 is initiated, and advancement is made to step S40. In step S40, as described above, observation lines 2g are placed inside the pickup image. Subsequently, upon advancing to step S50, movement of the line of light in respective observation lines 2g is monitored to compute shifts in the moving speed of the line of light across the frames. Next, upon advancing to step S60, coordinate values at points where the moving speed of the line of light shifts are detected to specify the boundaries of object 2a on the pickup image in order to compute the height of object 2a. Processing next advances to step S70.

In step 70, distance d from camera 101 to an observation point and height ht from the road surface to the observation point are computed using Formulas (3) and (4) previously mentioned. Processing advances to step S80. In step S80, lateral position x of the observation point on object 2a is computed using Formula (5) in order to compute the width of the object. Subsequently, advancement is made to step S90.

In step S90, whether the ignition switch of the vehicle has been turned-off or not is determined. When a conclusion is reached that the ignition switch of the vehicle is not off, the processing is repeated upon returning to step S40. In contrast, when the ignition switch of the vehicle is off, advancement is made to step S100. In step S100, the scanning using the line of light by projector 104 and the image capturing by camera 101 are ended in order to end the processing.

According to the embodiments explained above, a number of functions/effects can be attained. First, the pickup image is divided using observation lines 2g, and points at which the moving speed of the line of light shifts in respective observation lines 2g are detected to specify the coordinate values at the shifting points in order to specify the top and bottom positions of the object, that is, boundaries of the object in the vertical direction, in observation lines 2g in order to detect the height of the object. As such, the boundaries of the object in the vertical direction can be specified in order to detect the height of the object in the image by recognizing that while the moving speed of the line of light is constant in a coverage area where the line of light is scanning a part that appears as a flat surface when looked at from above, the moving speed of the line of light is slower in a coverage area where a height from the road surface is present.

Another observation is that distance d from camera 101 to the observation point and height ht from the road surface to the observation point can be computed using Formulas (3) and (4) based on known camera installation height hc and projector height hl, current irradiating direction θ1, and vertical angle θcy visible from camera 101. As a result, there is no need to provide any additional sensors for detecting distance d from camera 101 to the observation point and height ht from the road surface to the observation point, resulting in an advantage in terms of cost. Furthermore, the height of the object in real space can be computed highly accurately by computing height ht to the top of the object specified based on the detection results on the points where the moving speed of the line of light shifts.

Lateral position x of the observation point on object 2a can be computed based on distance d from camera 101 to the observation point using Formula (4) and horizontal angle θcx at which the observation point is visible from camera 101. As a result, there is no need to provide an additional sensor to detect lateral position x of the observation point on object 2a, resulting in an advantage in terms of cost. Furthermore, the lateral position and the width of the object in real space can be computed highly accurately by computing lateral position x of the observation point in observation line 2g that is present at the boundary where a shift in the moving speed of the line of light is detected out of multiple observation lines 2g placed on the pickup image.

Movements of the line of light in respective observation lines 2g can be detected by computing differences in the images across frames, and the moving speed of the line of light in observation lines 2g on the image is then computed by dividing the positional shifts of the line of light across the frames, that is, shifts in the coordinate values in the vertical direction on the images, by the frame rate of camera 101. As a result, the moving speed of the line of light in observation lines 2g on the image can be computed highly accurately by monitoring the movement of the line of light across the frames.

Figure 7:
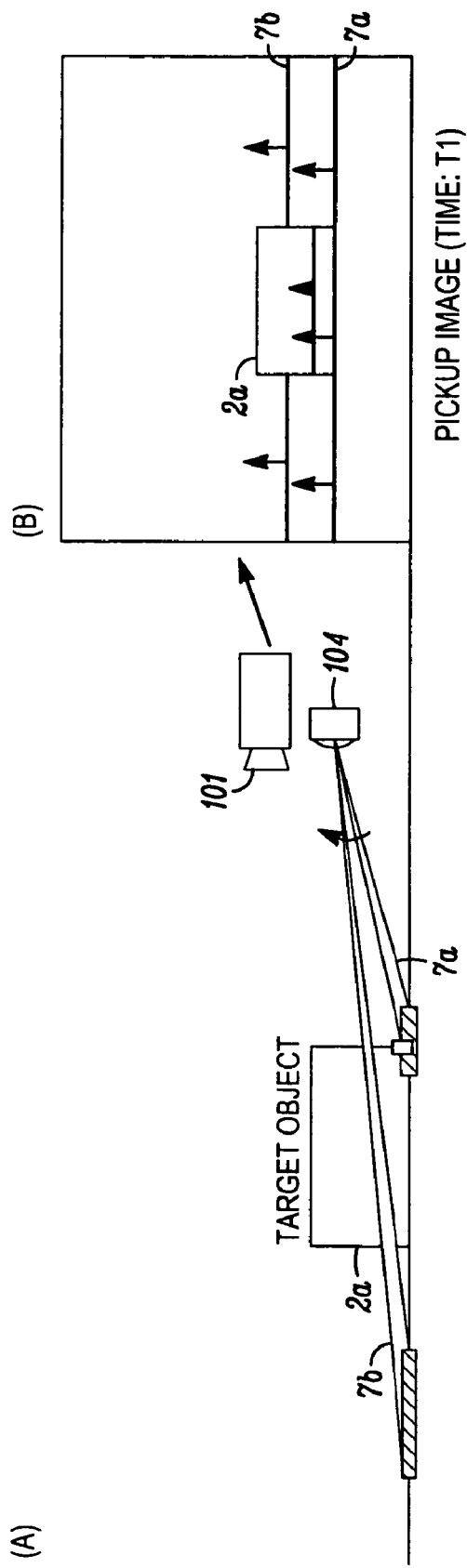
FIG. 7 is a diagram showing an example when multiple lines of light are irradiated from the projector.

Furthermore, the on-board object detector as described herein can be modified in many ways. In the discussion above, by example, a single narrow line of light was irradiated from projector 104 to the front of the vehicle parallel to the road surface. However, this does not impose any restriction, and multiple lines of light may be irradiated from projector 104. For example, as shown in representation (A) of FIG. 7, two lines of light 7a and 7b may be irradiated from projector 104.

Because lines of light 7a and 7b appear in the pickup image (B) captured by camera 101, observation lines 2g are placed on the pickup image as described previously, and moving speeds of respective lines of light 7a and 7b in observation lines 2g are computed in order compute the height of the object in the image. Then, Formulas (3)-(5) are applied to those observation points in observation lines 2g created by respective lines of light 7a and 7b in order to compute distances d to the respective observation points, height ht and lateral position x.

As such, because multiple lines of light can be used for observations during 1 cycle of scanning for which one line of light would otherwise be used, the processing speed can be increased.

In another example of a modification, an example in which the line of light was used to scan from the bottom up while shifting the irradiation angle from the bottom up from projector 104 was previously explained. However, this does not impose any restriction, and the irradiation angle may be shifted from the top down.

In the description above, an example in which the line of light was irradiated to the front of the vehicle using projector 104, and images in front of the vehicle were captured using camera 101 in order to detect an object that was present in front of the vehicle was explained. However, this does not impose any restriction, and the line of light may be irradiated in a different direction in which an object is to be detected. For example, the line of light may be irradiated toward the rear of the vehicle for scanning using projector 104, and images to the rear of the vehicle are captured using camera 101 in order to detect an object that is present in the rear of the vehicle.

This application is based on Japanese Patent Application No. 2005-135074, filed May 6, 2005 in the Japanese Patent Office, the entire contents of which are hereby incorporated by reference.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An on-board object detector, comprising:
a projector that irradiates a horizontally-extending line of light in a direction of an object to be detected while shifting an irradiation angle of the line of light in a vertical direction;
a pickup device that captures images within a coverage area where the line of light is irradiated;
a controller that captures shifts in a moving speed of the line of light within the images and that detects the object based on the shifts in the moving speed of the line of light.

2. The on-board object detector according to claim 1 wherein the controller detects positions of shifting points in the moving speed of the line of light, the shifting points being boundaries of the object in the vertical direction.

3. The on-board object detector according to claim 1 wherein the controller computes at least one of a height of the object and a distance from the pickup device to the object based on detected boundaries of the object in the vertical direction.

4. The on-board object detector according to claim 3 wherein the controller computes the height using the formula $(hc \cdot \tan θ1 - hl \cdot \tan θcy)/(\tan θcy - \tan θ1);$ wherein hc is an installation height of the pickup device from a road surface, hl is an installation height of the projector from the road surface, θ1 is a current irradiation angle of the line of light in the vertical direction, and θcy is an angle in the vertical direction at which an observation point on the object is visible from the pickup device.

5. The on-board object detector according to claim 3 wherein the controller computes the distance using the formula $(hc-hl)/(\tan θcy - \tan θ1);$ wherein hc is an installation height of the pickup device from a road surface, hl is an installation height of the projector from the road surface, θ1 is a current irradiation angle of the line of light in the vertical direction, and θcy is an angle in the vertical direction at which an observation point on the object is visible from the pickup device.

6. The on-board object detector according to claim 5 wherein the controller computes at least one of a position of the object in a horizontal direction and a width of the object based on the distance.

7. The on-board object detector according to claim 6 wherein the controller computes the position of the object in a horizontal direction using the formula $\tan θcx = x/d;$ wherein x is a lateral position of the observation point on the object, d is the distance and θcx is an angle in a horizontal direction at which the object is visible from the pickup device.

8. The on-board object detector according to claim 7 wherein the controller calculates lateral positions x for multiple observation points within multiple observation lines placed on the image, the lateral positions x indicating the width of the object.

9. The on-board object detector according to claim 3 wherein the controller computes at least one of a position of the object in a horizontal direction and a width of the object based on the distance.

10. The on-board object detector according to claim 1 wherein the controller computes at least one of a position of the object in a horizontal direction and a width of the object based on a computed distance to the object from the pickup device.

11. The on-board object detector according to claim 1 wherein the pickup device captures images sequentially over prescribed time intervals.

12. The on-board object detector according to claim 1 wherein the projector shifts the irradiation angle of the line of light from a bottom up.

13. An on-board object detector, comprising:
projection means for irradiating a horizontally-extending line of light in a direction of an object to be detected while shifting an irradiation angle in the vertical direction;
pickup means for capturing images within a coverage area where the line of light is irradiated by the projection means;
velocity computation means for computing shifts in a moving speed of the line of light within the images based on the images captured by the pickup means; and
object detection means for detecting the object based on the shifts in the moving speed of the line of light within the images as computed by the velocity computation means.

14. An on-board object detection method, comprising:
irradiating a horizontally-extending line of light in a direction of an object to be detected while shifting an irradiation angle in a vertical direction;
capturing images within a coverage area where the line of light is irradiated;
computing shifts in a moving speed of the line of light within the images; and
detecting the object based on the shifts in the moving speed of the line of light.

15. The on-board object detection method according to claim 14, further comprising:
calculating the moving speed of the line of light within the images.

16. The on-board object detection method according to claim 15, further comprising:
dividing the images by multiple observation lines with a prescribed width; and wherein calculating the moving speed of the line of light within the images further includes computing the moving speed of the line of light within adjacent observation lines by dividing position shifts of the line of light across successive images by a frame rate.

17. The on-board object detection method according to claim 14 wherein detecting the object based on the shifts in the moving speed of the line of light further comprises detecting positions of shifting points in the moving speed, the positions of the shifting points indicating boundaries of the object in the vertical direction.

18. The on-board object detection method according to claim 17, further comprising:
computing at least one of a height of the object and a distance from a camera capturing the images based on the boundaries of the object in the vertical direction.

19. The on-board object detection method according to claim 14, further comprising:
computing at least one of a position of the object in a horizontal direction and a width of the object based on a computed distance to the object from a camera capturing the images.

20. The on-board object detection method according to claim 14 wherein shifting the irradiation angle in the vertical direction further comprises shifting the irradiation angle of the line of light from a bottom up.

* * * * *